(12) United States Patent
Moriishi et al.

(10) Patent No.: US 10,665,867 B2
(45) Date of Patent: May 26, 2020

(54) AIR BATTERY INCLUDING NEGATIVE ELECTRODE, POSITIVE ELECTRODE, NONAQUEOUS METAL ION CONDUCTOR, AND OXYGEN EVOLVING CATALYST

(71) Applicant: Panasonic Intellectual Property Management Co., Ltd., Osaka (JP)

(72) Inventors: Masako Moriishi, Osaka (JP); Yu Otsuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 39 days.

(21) Appl. No.: 15/984,416

(22) Filed: May 21, 2018

(65) Prior Publication Data
US 2018/0358628 A1    Dec. 13, 2018

(30) Foreign Application Priority Data
Jun. 12, 2017    (JP) .................. 2017-115183

(51) Int. Cl.
| | |
|---|---|
| *H01M 4/86* | (2006.01) |
| *H01M 4/90* | (2006.01) |
| *H01M 12/08* | (2006.01) |
| *H01M 12/02* | (2006.01) |
| *H01M 4/38* | (2006.01) |

(52) U.S. Cl.
CPC ......... *H01M 4/9008* (2013.01); *H01M 4/382* (2013.01); *H01M 4/9083* (2013.01); *H01M 12/08* (2013.01); *H01M 2004/8689* (2013.01)

(58) Field of Classification Search
None
See application file for complete search history.

(56) References Cited

U.S. PATENT DOCUMENTS

| | | | |
|---|---|---|---|
| 2012/0028137 A1* | 2/2012 | Chase | H01M 4/382 |
| | | | 429/405 |
| 2013/0040210 A1 | 2/2013 | Mizuno et al. | |
| 2014/0234733 A1* | 8/2014 | Roev | H01M 4/8668 |
| | | | 429/405 |
| 2016/0181648 A1 | 6/2016 | Auger et al. | |

FOREIGN PATENT DOCUMENTS

| | | |
|---|---|---|
| JP | 2013-527567 | 6/2013 |
| JP | 2016-536253 | 11/2016 |
| WO | 2011/111185 | 9/2011 |
| WO | 2011/133982 | 10/2011 |

* cited by examiner

*Primary Examiner* — Yoshitoshi Takeuchi
(74) *Attorney, Agent, or Firm* — McDermott Will & Emery LLP (57) ABSTRACT

An air battery includes a negative electrode allowing a metal ion to be occluded in the negative electrode and released from the negative electrode, a positive electrode configured to use oxygen in the air as a positive electrode active material, a nonaqueous metal ion conductor disposed between the negative electrode and the positive electrode, and oxygen evolving catalysts. The positive electrode includes a carbon material. At least one of the oxygen evolving catalysts is fixed to the surface of the carbon material through a Si—O bond.

8 Claims, 3 Drawing Sheets

AIR BATTERY INCLUDING NEGATIVE ELECTRODE, POSITIVE ELECTRODE, NONAQUEOUS METAL ION CONDUCTOR, AND OXYGEN EVOLVING CATALYST

BACKGROUND

1. Technical Field

The present disclosure relates to air batteries.

2. Description of the Related Art

Air batteries are a type of batteries which use oxygen in the air as a positive electrode active material, and use, as a negative electrode active material, a metal or compound capable of occluding and releasing metal ions. Some advantages of air batteries are high energy density, and easy miniaturization and weight reduction. Thus, air batteries attract attention on account of the possibility that they can outperform in terms of energy density lithium ion densities which are seen as having the highest energy density of all existing batteries.

For example, in a lithium air battery, lithium peroxide is precipitated on a positive electrode by discharging reaction and is decomposed by charging reaction. The charging reaction is retarded by the poor electron conductivity of lithium peroxide, and this fact is an obstacle in the enhancement of lithium air batteries in cycle characteristics. Japanese Unexamined Patent Application Publication (Translation of PCT Application) No. 2013-527567 describes an air battery in which an electrolytic solution contains an oxygen evolving catalyst to allow for efficient decomposition of lithium peroxide. An oxygen evolving catalyst mediates the movement of electrons between a positive electrode and lithium peroxide and thereby promotes the decomposition of lithium peroxide, thus allowing the charging potential to be decreased.

SUMMARY

In one general aspect, the techniques disclosed here feature an air battery which includes a negative electrode allowing a metal ion to be occluded in the negative electrode and released from the negative electrode, a positive electrode configured to use oxygen in the air as a positive electrode active material, a nonaqueous metal ion conductor disposed between the negative electrode and the positive electrode, and oxygen evolving catalysts. The positive electrode includes a carbon material. At least one of the oxygen evolving catalysts is fixed to a surface of the carbon material through a Si—O bond.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

The present inventors studied the actions and effects of oxygen evolving catalysts, and consequently have found that conventional air batteries using an oxygen evolving catalyst have a problem in that the oxygen evolving catalyst contained in an electrolytic solution loses its activity when brought into contact with a negative electrode metal.

In an aspect of the air batteries described in Japanese Unexamined Patent Application Publication (Translation of PCT Application) No. 2013-527567, the oxygen evolving catalyst is incorporated as a part of a backbone or as a pendant group into the polymer structure. Japanese Unexamined Patent Application Publication (Translation of PCT Application) No. 2013-527567 describes that an end of the polymer structure may be chemically grafted to the surface of the positive electrode.

An air battery according to the first aspect of the present disclosure includes:

- a negative electrode allowing a metal ion to be occluded in the negative electrode and released from the negative electrode;
- a positive electrode configured to use oxygen in the air as a positive electrode active material;
- a nonaqueous metal ion conductor disposed between the negative electrode and the positive electrode; and oxygen evolving catalysts.

The positive electrode includes a carbon material.

At least one of the oxygen evolving catalysts is fixed to the surface of the carbon material through a Si—O bond. Each of the oxygen evolving catalysts may have silicon. The carbon material may have oxygen.

In the air battery of the first aspect, at least one of the oxygen evolving catalysts is fixed to the surface of the carbon material in the positive electrode through a Si—O bond. This structure can suppress the deactivation of the oxygen evolving catalyst by the contact of the oxygen evolving catalyst with the metal of the negative electrode. Because the catalytic effects (such as the promotion of the decomposition of lithium peroxide) can be obtained over an extended period of time, the cycle characteristics of the air battery are enhanced. As compared to when the oxygen evolving catalyst is simply mixed in the positive electrode, the oxygen evolving catalyst in the air battery of the first aspect can be distributed uniformly in the positive electrode. As a result, a sufficient activity can be obtained at a small dose of the oxygen evolving catalyst, and also the reduction in the internal resistance of the positive electrode can be expected. Si—O bonds are used as a structure for fixing the oxygen evolving catalyst to the surface of the carbon material. Si—O bonds can be formed through simple operations and under mild conditions, and thus the amount of the oxygen evolving catalyst fixed to the carbon material can be controlled. The fixation of the oxygen evolving catalyst using Si—O bonds is advantageous in that an appropriate amount of the catalyst can be fixed to the carbon material easily by simple operations without the need of catalyzing the fixation in contrast to other fixation methods such as fixation through amide bonds or the like, or fixation using electropolymerization.

The oxygen evolving catalysts may be partly present in the nonaqueous metal ion conductor.

In the second aspect of the present disclosure, for example, each of the oxygen evolving catalysts in the air battery of the first aspect may be a compound having redox properties. According to the second aspect, the compound is cationized by oxidation to serve as the oxygen evolving catalyst, and therefore the oxidation potential of the compound determines the charging potential of the battery. That is, theoretically, the charging potential can be regulated to a desired value by the selection of the oxygen evolving catalyst. Further, the air battery of this aspect is inexpensive and lightweight because no noble metal catalysts are used.

In the third aspect of the present disclosure, each of the oxygen evolving catalysts in the air battery of the second aspect may be an organic compound.

In the fourth aspect of the present disclosure, for example, each of the oxygen evolving catalysts in the air battery of any of the first to the third aspects may be a compound having a structure represented by the following formula (1). Such a compound having a structure of the formula (1) can fully exhibit functions required for the oxygen evolving catalyst.

(1)

In the formula (1), $R_1$ to $R_4$ are each independently a functional group including one selected from the group consisting of a linear aliphatic group, a cyclic aliphatic group, a hydrogen atom, a hydroxyl group, a cyano group, an amino group, a nitro group, a nitroso group, a vinyl group, an epoxy group, a methacryloyl group, an acryloyl group, an ureido group, a mercapto group and an isocyanate group.

In the fifth aspect of the present disclosure, the linear aliphatic group in the air battery of the fourth aspect may include one selected from the group consisting of an oxygen atom, a nitrogen atom, a sulfur atom, a silicon atom, a phosphorus atom, a boron atom and a halogen atom.

In the sixth aspect of the present disclosure, the cyclic aliphatic group in the air battery of the fourth aspect may include one selected from the group consisting of an oxygen atom, a nitrogen atom, a sulfur atom, a silicon atom, a phosphorus atom, a boron atom and a halogen atom.

In the seventh aspect of the present disclosure, for example, at least one selected from $R_1$ to $R_4$ in the air battery of the fourth aspect may be bonded to the surface of the carbon material through the Si—O bond. According to the seventh aspect, the active portion of the oxygen evolving catalyst (for example, tetrathiafulvalene (TTF) skeleton) can be strongly fixed to the carbon material.

In the eighth aspect of the present disclosure, for example, each of the oxygen evolving catalysts in the air battery of any of the first to the third aspects may be a compound having a structure represented by the following formula (2).

Such a compound having a structure of the formula (2) can fully exhibit functions required for the oxygen evolving catalyst.

(2)

In the formula (2), $R_1$ to $R_4$ are each independently a functional group including one selected from the group consisting of a linear aliphatic group, a cyclic aliphatic group, a hydrogen atom, a hydroxyl group, a cyano group, an amino group, a nitro group, a nitroso group, a vinyl group, an epoxy group, a methacryloyl group, an acryloyl group, an ureido group, a mercapto group and an isocyanate group, $R_5$ is a saturated hydrocarbon group with 1 to 6 carbon atoms or an unsaturated hydrocarbon group with 1 to 6 carbon atoms, and $R_6$ to $R_8$ are each independently a functional group including at least one selected from the group consisting of a methoxy group, an ethoxy group, a 2-methoxyethoxy group and an acetoxy group.

In the ninth aspect of the present disclosure, the linear aliphatic group in the air battery of the eighth aspect may include one selected from the group consisting of an oxygen atom, a nitrogen atom, a sulfur atom, a silicon atom, a phosphorus atom, a boron atom and a halogen atom.

In the tenth aspect of the present disclosure, the cyclic aliphatic group in the air battery of the eighth aspect may include one selected from the group consisting of an oxygen atom, a nitrogen atom, a sulfur atom, a silicon atom, a phosphorus atom, a boron atom and a halogen atom.

In the eleventh aspect of the present disclosure, the saturated hydrocarbon group with 1 to 6 carbon atoms in the air battery of the eighth aspect may have a substituent.

In the twelfth aspect of the present disclosure, the unsaturated hydrocarbon group with 1 to 6 carbon atoms in the air battery of the eighth aspect may have a substituent.

Hereinbelow, embodiments of the present disclosure will be described with reference to the drawings. The present disclosure is not limited to the embodiments illustrated below.

Figure 1:
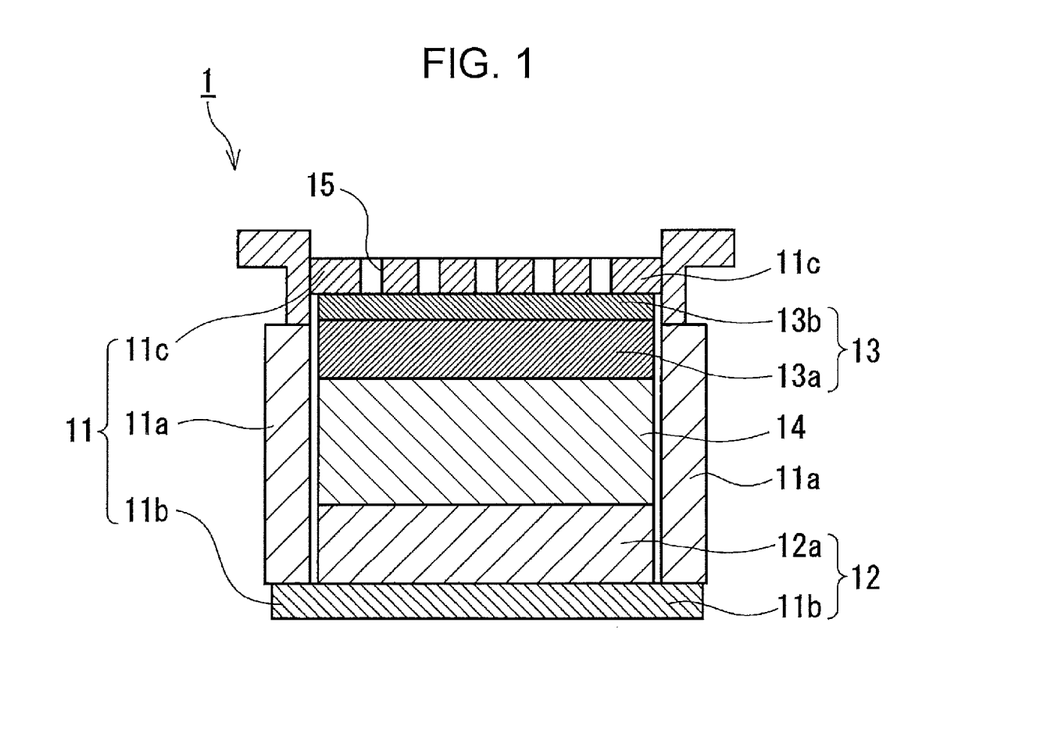
FIG. 1 is a schematic sectional view of a lithium air battery according to an embodiment of the present disclosure.

As illustrated in FIG. 1, a lithium air battery 1 of an embodiment includes a battery case 11, a negative electrode 12, a positive electrode 13, and an electrolyte layer 14 as a nonaqueous lithium ion conductor. The battery case 11 includes a cylindrical member 11a that is open on both the top side and the bottom side, a bottom member 11b disposed to cover the opening on the bottom side of the cylindrical member 11a, and a lid member 11c disposed to cover the opening on the top side of the cylindrical member 11a. The lid member 11c has air passage holes 15 through which air is taken into the battery case 11. The negative electrode 12 includes a negative electrode layer 12a disposed on the surface of the bottom member 11b inside the battery case 11. The bottom member 11b of the battery case 11 also serves as a negative electrode current collector for the negative electrode 12. That is, the negative electrode 12 is composed of the bottom member 11b serving as the negative electrode current collector, and the negative electrode layer 12a. The positive electrode 13 is composed of a positive electrode layer 13a containing a carbon material, and a positive electrode current collector 13b disposed between the positive electrode layer 13a and the lid member 11c of the battery case 11. The lithium air battery 1 may further include a separator contained in the electrolyte layer 14.

The battery reactions in the lithium air battery having the above configuration are as follows:

Discharging reaction (during service of the battery)

Negative electrode: $2Li \rightarrow 2Li^+ + 2e^-$ (A1)

Positive electrode: $2Li^+ + 2e^- + O_2 \rightarrow Li_2O_2$ (A2)

Charging Reaction (During Charging of the Battery)

Negative electrode: $2Li^+ + 2e^- \rightarrow 2Li$ (A3)

Positive electrode: $Li_2O_2 \rightarrow 2Li^+ + 2e^- + O_2$ (A4)

During discharging, as shown in the formulae (A1) and (A2), electrons and lithium ions are released from the negative electrode. The electrons are transferred to the positive electrode, and concurrently the reaction occurs on the positive electrode between oxygen supplied from the outside of the battery, and the lithium ions, forming lithium oxide. During charging, as shown in the formulae (A3) and (A4), electrons, lithium ions and oxygen are released from the positive electrode, and the electrons and lithium ions are coupled on the negative electrode. The oxygen evolving catalyst is a material that promotes the reaction shown in the formula (A4).

Next, configurations of the lithium air battery 1 will be described in detail.

1. Positive Electrode

The positive electrode 13 includes a positive electrode layer 13a as mentioned above, and may further include a positive electrode current collector 13b. The positive electrode layer 13a and the positive electrode current collector 13b will be described below.

(Positive Electrode Layer)

The positive electrode layer 13a includes a carbon material and an oxygen evolving catalyst. At least part of the oxygen evolving catalyst is fixed to the surface of the carbon material through a Si—O bond. This structure can suppress the deactivation of the oxygen evolving catalyst by the contact of the oxygen evolving catalyst with the metal of the negative electrode 12. Because the catalytic effects (such as the promotion of the decomposition of lithium peroxide) can be obtained over an extended period of time, the cycle characteristics of the air battery are enhanced. As compared to when the oxygen evolving catalyst is simply mixed in the positive electrode 13, the oxygen evolving catalyst in the air battery of the present embodiment can be distributed uniformly in the positive electrode 13. As a result, a sufficient activity can be obtained at a small dose of the oxygen evolving catalyst, and also the reduction in the internal resistance of the positive electrode 13 can be expected. Si—O bonds are used as a structure for fixing the oxygen evolving catalyst to the surface of the carbon material. Si—O bonds can be formed through simple operations and under mild conditions, and thus the amount of the oxygen evolving catalyst fixed to the carbon material can be controlled.

In the positive electrode layer 13a, the carbon material may be porous and may have high electron conductivity. Specifically, a conductive auxiliary such as acetylene black or Ketjen black may be used as the carbon material in the positive electrode layer 13a. Of these carbon materials, a conductive carbon black such as Ketjen black may be used from the points of view of specific surface area and the size of primary particles. The carbon material is usually a powder.

The oxygen evolving catalyst mediates the movement of electrons between the carbon material and lithium peroxide and thereby promotes the decomposition of lithium peroxide, thus allowing the charging potential to be decreased. The oxygen evolving catalyst is a compound having redox properties. In this case, the compound is cationized by oxidation to serve as the oxygen evolving catalyst, and therefore the oxidation potential of the compound determines the charging potential of the battery. That is, theoretically, the charging potential can be regulated to a desired value by the selection of the oxygen evolving catalyst. Further, the lithium air battery 1 of the present embodiment is inexpensive and lightweight because no noble metal catalysts are used. For example, the oxygen evolving catalyst has a redox potential that is more noble than the standard electrode potential of lithium peroxide (2.96 V vs. Li/Li$^+$) resulting from the reaction of lithium ions with oxygen. Specifically, the oxygen evolving catalyst may be a compound having a structure represented by the following formula (1). Such a compound having a structure of the formula (1) can fully exhibit functions required for the oxygen evolving catalyst.

(1)

In the formula (1), $R_1$ to $R_4$ are each independently a functional group including one selected from the group consisting of a linear aliphatic group, a cyclic aliphatic group, a hydrogen atom, a hydroxyl group, a cyano group, an amino group, a nitro group, a nitroso group, a vinyl group, an epoxy group, a methacryloyl group, an acryloyl group, an ureido group, a mercapto group and an isocyanate group. The linear or cyclic aliphatic group may include one selected from the group consisting of an oxygen atom, a nitrogen atom, a sulfur atom, a silicon atom, a phosphorus atom, a boron atom and a halogen atom.

When $R_1$ to $R_4$ are hydrogen atoms, the compound of the formula (1) is tetrathiafulvalene (TTF). Tetrathiafulvalene has a plenty of π electrons, is strongly electron donating and has molecular symmetry, and thus can exist in a stable state with the π electrons being largely delocalized. This feature allows tetrathiafulvalene to be reversibly oxidized and reduced stably and repeatedly, which makes the compound an excellent oxygen evolving catalyst. This feature is maintained even if the compound is substituted with the functional groups described above in place of at least one hydrogen atom.

At least one selected from $R_1$ to $R_4$ is bonded to the surface of the carbon material through a Si—O bond. With such a structure, the active portion of the oxygen evolving catalyst (for example, TTF skeleton) can be strongly fixed to the carbon material.

The oxygen evolving catalyst is typically a compound having a structure represented by the following formula (2). Such a compound having a structure of the formula (2) can fully exhibit functions required for the oxygen evolving catalyst.

(2)

In the formula (2), $R_1$ to $R_4$ are the same as defined above, and $R_5$ is a saturated hydrocarbon group with 1 to 6 carbon atoms or an unsaturated hydrocarbon group with 1 to 6 carbon atoms. The saturated hydrocarbon group with 1 to 6 carbon atoms may have a substituent, and the unsaturated hydrocarbon group with 1 to 6 carbon atoms may have a substituent. $R_6$ to $R_8$ are each independently a functional group including at least one selected from the group consisting of a methoxy group, an ethoxy group, a 2-methoxyethoxy group and an acetoxy group. Numerous functional groups such as hydroxyl groups (—OH) and carboxyl groups (—COOH) are present on the surface of a porous carbon material such as conductive carbon black. The alkoxy group (—OR) of the oxygen evolving catalyst is hydrolyzed into a silanol group (Si—OH), which reacts with the hydroxyl group on the surface of the carbon material to form a strong covalent bond (Si—O bond). On the surface of the carbon material, molecules of the oxygen evolving catalyst may form a siloxane bond (Si—O—Si) together. That is, $R_6$ to $R_8$ may each independently be an oxygen atom.

The positive electrode layer 13a may include a binder which binds the carbon material. Examples of the binders include polyvinylidene fluoride (PVdF) and polytetrafluoroethylene (PTFE). The content of the binder in the positive electrode layer 13a is not particularly limited and is, for example, in the range of 1 mass % to 40 mass %.

The thickness of the positive electrode layer 13a is not particularly limited and varies in accordance with factors such as the application in which the air battery is used. For example, the thickness of the positive electrode layer 13a is in the range of 2 μm to 500 μm, and may be in the range of 5 μm to 300 μm.

For example, the positive electrode layer 13a may be fabricated in the following manner. A solvent is added to a composition including a carbon material, and the mixture is mixed. Where necessary, the composition may contain additives such as a binder. The mixture (coating liquid) thus obtained is applied onto a positive electrode current collector 13b by an application method such as a doctor blade method, and the coating is dried. A positive electrode 13 is thus obtained. A coating of the mixture, after being dried, may be rolled by a method such as roll pressing to form a positive electrode layer 13a in the form of a sheet without a positive electrode current collector 13b. A positive electrode layer 13a in the form of a sheet may be fabricated directly by the pressing of the composition.

The treatment for fixing the oxygen evolving catalyst to the carbon material is performed prior to the fabrication of the positive electrode layer 13a. Specifically, the oxygen evolving catalyst which has a functional group for silane coupling reaction is dissolved into a dehydrated solvent to give a solution of the oxygen evolving catalyst. The carbon material is added to this solution, and thereafter the solution is subjected to an atmosphere at a pressure below the atmospheric pressure to cause the solution to penetrate into pores of the carbon material. The solution is stirred for several hours while performing heating to allow the silane coupling reaction to proceed. The solution is filtered, and the carbon material is washed with a dehydrated solvent several times to remove the unreacted oxygen evolving catalyst. The solvent is removed by vacuum drying the carbon material while performing heating. Consequently, the oxygen evolving catalyst can be fixed to the surface of the particles of the carbon material including the surface of the inside of the pores.

In the step of fixing the oxygen evolving catalyst to the surface of the carbon material, the amount in which the oxygen evolving catalyst is bonded to the carbon material can be controlled easily by controlling the concentration of the oxygen evolving catalyst in the solution. The amount of the oxygen evolving catalyst bonded to the carbon material is not particularly limited. In an example, $1.0 \times 10^{-6}$ to $1.0 \times 10^{-3}$ mol oxygen evolving catalyst may be supported on 1 g of the carbon material.

(Positive Electrode Current Collector)

The positive electrode current collector 13b collects current for the positive electrode layer 13a. The material of the positive electrode current collector 13b is not particularly limited as long as the material has electrical conductivity. Examples of the materials for the positive electrode current collectors 13b include stainless steel, nickel, aluminum, iron, titanium and carbon. Examples of the shapes of the positive electrode current collectors 13b include foils, sheets and meshes (grids). Of these shapes, in the present embodiment, the positive electrode current collector 13b may be a mesh because the positive electrode current collector 13b in the form of a mesh has excellent current collecting efficiency. In this case, the mesh-shaped positive electrode current collector 13b may be disposed within the positive electrode layer 13a. The lithium air battery 1 of the present embodiment may have another positive electrode current collector (for example, a foil-shaped current collector) which collects charges collected by the mesh-shaped positive electrode current collector 13b. In the present embodiment, the battery case 11 described later may serve as a positive electrode current collector. The thickness of the positive electrode current collector 13b is in the range of, for example, 10 μm to 1000 μm, and may be in the range of 20 μm to 400 μm.

2. Negative Electrode

The negative electrode 12 includes a negative electrode layer 12a as already described, and may further include a negative electrode current collector. The negative electrode layer 12a and the negative electrode current collector will be described below.

(Negative Electrode Layer)

The negative electrode layer 12a includes a negative electrode active material having a metal. The negative electrode active material is capable of occluding and releasing metal ions. The negative electrode active material may be any material containing a metal element without limitation, and examples thereof include elementary metals, alloys, metal oxides and metal nitrides. Examples of the elementary metals include lithium, sodium, calcium, magnesium, aluminum and zinc. Examples of the alloys include lithium aluminum alloy, lithium tin alloy, lithium lead alloy and lithium silicon alloy. Examples of the metal oxides include lithium titanium oxide. Examples of the metal nitrides include lithium cobalt nitride, lithium iron nitride and lithium manganese nitride.

The negative electrode layer 12a may contain the negative electrode active material alone, or may further contain a binder in addition to the negative electrode active material.

The binder may be a known material used as a binder in a negative electrode layer of an air battery, with examples including PVdF and PTFE. The content of the binder in the negative electrode layer 12a is not particularly limited and is, for example, in the range of 1 mass % to 40 mass %. The negative electrode layer 12a may be fabricated using a powdery negative electrode active material by a method such as a doctor blade method or a pressing method.

(Negative Electrode Current Collector)

The negative electrode current collector collects current for the negative electrode layer 12a. The material of the negative electrode current collector is not particularly limited as long as the material has electrical conductivity. Examples of the materials for the negative electrode current collectors include copper, stainless steel, nickel and carbon. Examples of the shapes of the negative electrode current collectors include foils, sheets and meshes (grids). The negative electrode current collector may be a porous body having irregularities on the surface. The battery case 11 described later may serve as a negative electrode current collector.

3. Separator

The separator is a member disposed between the positive electrode 13 and the negative electrode 12. The separator is not particularly limited as long as it can electrically separate the positive electrode layer 13a and the negative electrode layer 12a from each other. Examples of the separators include porous films such as polyethylene (PE) porous films and polypropylene (PP) porous films, resin nonwoven fabrics such as PE nonwoven fabrics and PP nonwoven fabrics, glass fiber nonwoven fabrics, and porous insulating materials such as paper nonwoven fabrics.

The porosity of the separator is, for example, in the range of 30 to 90%. When the porosity is in this range, a sufficient amount of the electrolyte is held by the separator and the separator has sufficient strength. The porosity of the separator may be in the range of 35 to 60%. The porosity may be calculated from the true density of the material, the total volume including pores, and the weight.

4. Electrolyte Layer

The electrolyte layer 14 is a layer which is disposed between the positive electrode 13 and the negative electrode 12 and conducts metal ions. The form of the electrolyte layer 14 is not particularly limited as long as the layer is a metal ion conductor having metal ion conductivity. The electrolyte layer 14 may be in the form of a solution such as an organic solvent containing a metal salt as the electrolyte, or a solid film such as a polymer solid electrolyte system containing a metal salt. The electrolyte layer 14 may be a gel.

When the electrolyte layer 14 is a solution or a gel, a nonaqueous electrolytic solution prepared by dissolving a metal salt into a nonaqueous solvent may be used as the electrolyte layer 14.

Examples of lithium salts as electrolytes contained in the nonaqueous electrolytic solution include lithium perchlorate ($LiClO_4$), lithium hexafluorophosphate ($LiPF_6$), lithium tetrafluoroborate ($LiBF_4$), lithium trifluoromethanesulfonate ($LiCF_3SO_3$) and bis(trifluoromethanesulfonyl)amide lithium ($LiN(CF_3SO_2)_2$). The lithium salts are not limited to those mentioned above, and may be any lithium salts known as electrolytes in nonaqueous electrolytic solutions for lithium air batteries.

The concentration of the electrolyte in the nonaqueous electrolytic solution is, for example, 0.5 to 2.5 mol/L. When the electrolyte layer 14 is a solution, that is, when the nonaqueous electrolytic solution is used, as described earlier, the electrolyte layer 14 may be formed by impregnating the separator with the nonaqueous electrolytic solution so that the separator will hold the nonaqueous electrolytic solution.

The nonaqueous solvent may be any of known nonaqueous solvents used in nonaqueous electrolytic solutions for air batteries. In particular, linear ethers such as tetraethylene glycol dimethyl ether and tetraethylene glycol diethyl ether may be used as the solvents. As compared to carbonate solvents, linear ethers are less prone to induce side reactions other than the redox reaction of oxygen in the positive electrode 13.

5. Battery Case

The battery case 11 is not particularly limited as long as it can accommodate the positive electrode 13, the negative electrode 12 and the electrolyte layer 14 described hereinabove. The shape of the battery case 11 is not limited to that illustrated in FIG. 1, and the battery case 11 may take any of various shapes such as coin shapes, flat shapes, cylindrical shapes and laminates. The battery case 11 may be open to the air or may be closed. An open battery case has a vent for the passage of air which allows air to be brought into contact with the positive electrode 13. In the case of a closed battery case, gas inlet and outlet tubes may be provided in the closed battery case. In this case, the gas that is supplied and discharged may be a dry gas, may have a high oxygen concentration, or may be pure oxygen (99.99% oxygen concentration). The oxygen concentration may be high at the time of discharging, and may be low at the time of charging.

EXAMPLES

Hereinbelow, the present disclosure will be described in greater detail based on EXAMPLES. The EXAMPLES are only illustrative and do not intend to limit the scope of the present disclosure thereto.

Example 1

Figure 4:
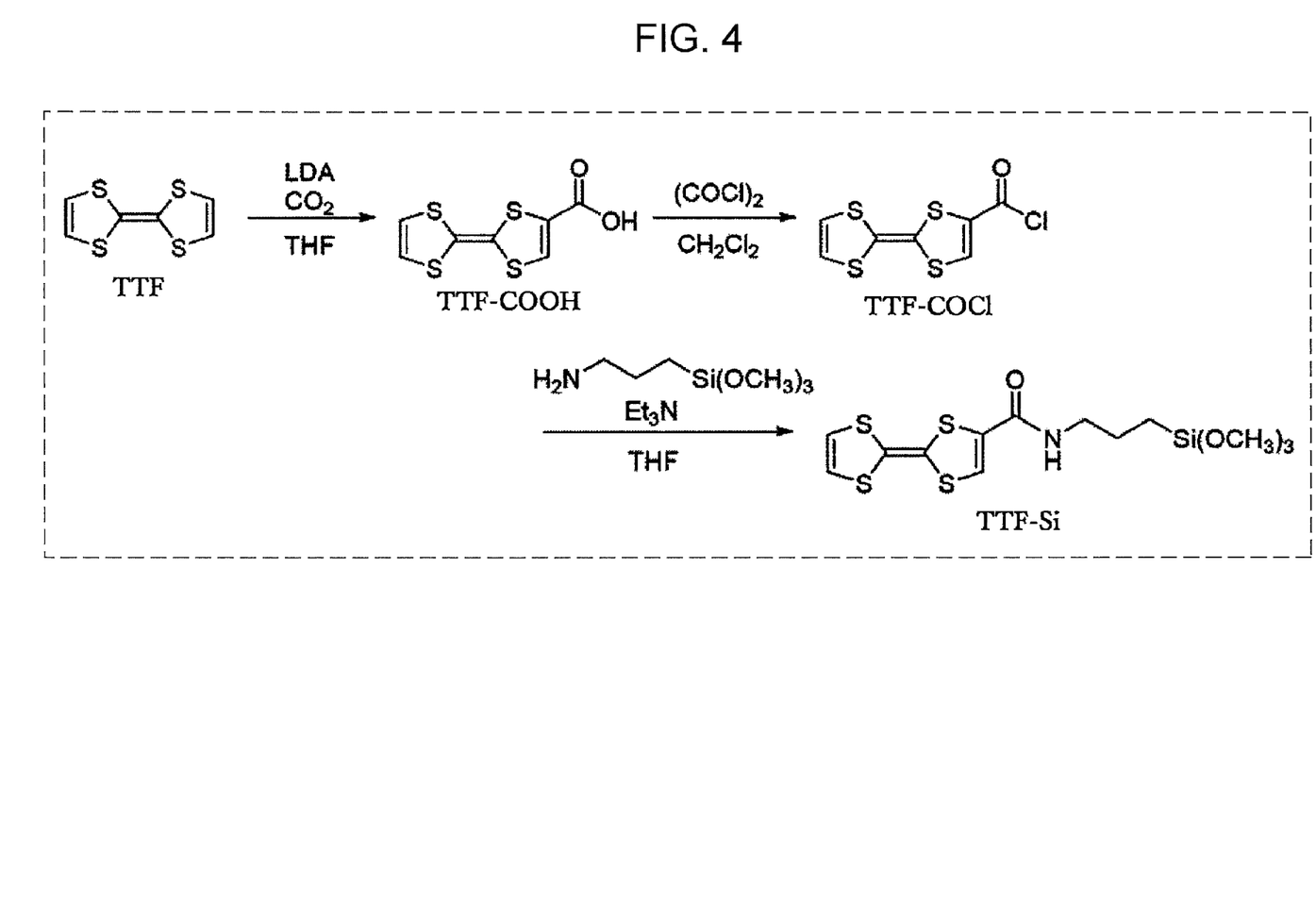
FIG. 4 is a view illustrating a scheme of the synthesis of an oxygen evolving catalyst.

An oxygen evolving catalyst with a structure represented by the formula (3) below was synthesized in accordance with the following procedures. All the operations were performed under the illumination of a yellow lamp while blocking other light. The synthetic scheme is shown in FIG. 4.

In a 2 L reaction vessel, TTF (20.7 g, 101 mmol) was dissolved into a mixed solvent containing 500 mL dehydrated diethyl ether and 100 mL dehydrated tetrahydrofuran (THF). The resultant reaction liquid was cooled to −70° C. under a flow of argon. A 1.5 mol/L lithium diisopropylamide solution (74.0 mL, 111 mmol, 1.1 eq.) was added dropwise to the reaction liquid over a period of 30 minutes. Next, 10 L $CO_2$ gas was bubbled through the reaction liquid for 30 minutes, and the temperature of the reaction liquid was raised to ambient to precipitate a Li salt of TTF-COOH as a crystal. Unreacted TTF was removed by adding 1 L water to the reaction liquid and removing the organic phase. 500 mL diethyl ether was added to the aqueous phase, and the organic phase was removed again. 500 mL diethyl ether was added to the aqueous phase, and the pH of the reaction liquid was adjusted to 1 with 2 N HCl. The precipitate formed was removed by Celite filtration, and was washed with 200 mL diethyl ether. The organic phase of the filtrate was collected, and the crude product remaining in the aqueous phase was extracted with 500 mL diethyl ether two times. The organic phase thus extracted was combined with the organic phase collected previously, and the combined organic phase was dehydrated with magnesium sulfate. The precipitate was removed by suction filtration, and the filtrate was vacuum concentrated. The residue was vacuum dried at 50° C. overnight to give TTF-COOH (13.4 g, 54.0 mmol). The yield of TTF-COOH was 53.5%.

In a 3 L reaction vessel, TTF-COOH (10.8 g, 43.6 mmol) was dissolved into 1 L dehydrated THF. The reaction liquid thus obtained was heated to 50° C. under a flow of argon. Oxalyl chloride (15.0 mL, 177 mmol, 4.0 eq.) was added dropwise to the reaction liquid over a period of 20 minutes, and thereafter 40 μL dimethylformamide (DMF) was added. The reaction liquid was heated for 2 hours while performing stirring. The complete consumption of the raw materials was confirmed by thin-layer chromatography (TLC), and the heating was terminated.

The reaction liquid was cooled to room temperature, and the insolubles were filtered through Celite and washed with 300 mL THF. The filtrate was vacuum concentrated, and azeotropic separation was performed using 100 mL toluene two times. TTF-COCl (11.5 g, 43.1 mmol) was thus obtained. The yield of TTF-COCl was 98.9%.

In a 2 L reaction vessel, TTF-COCl (11.4 g, 42.8 mmol) and triethylamine (7.21 mL, 51.7 mmol, 1.2 eq.) were dissolved into 400 mL dehydrated diethyl ether. At room temperature, 3-aminopropyltrimethoxysilane (7.68 mL, 43.7 mmol, 1.02 eq.) was added to the reaction liquid under a flow of argon. The reaction liquid was stirred for 30 minutes. The complete consumption of the raw materials was confirmed by TLC, and the stirring was terminated. The reaction liquid was vacuum concentrated, and 200 mL hexane was added. The mixture was filtered to separate the precipitate, which was then vacuum dried at room temperature overnight to afford powdery TTF-Si (12.5 g, 30.5 mmol). The yield of TTF-Si was 71.3%.

The compound synthesized was identified by $^1$H-NMR. As a result, the target product was obtained with high purity. In the manner described above, the silane coupling group was introduced to the TTF skeleton via an amide bond and a linear aliphatic group.

(3)

The trimethoxysilane group of the oxygen evolving catalyst of the formula (3) was reacted with the hydroxyl group present on the surface of particles of Ketjen black (manufactured by Lion Corporation) by silane coupling reaction, and thereby the oxygen evolving catalyst was fixed to the surface of the Ketjen black particles through a Si—O bond. Specifically, the oxygen evolving catalyst of the formula (3) was dissolved in dehydrated toluene, a Ketjen black powder as a carbon material was added to the resultant solution, and the solution was subjected to a pressure below the atmospheric pressure to cause the solution to penetrate into pores of the carbon material. The silane coupling reaction was allowed to proceed by stirring the solution at 60° C. for several hours. The solution was washed with dehydrated toluene several times to remove the unreacted oxygen evolving catalyst. The solvent was removed by vacuum drying the carbon material while performing heating at 80° C. Consequently, the oxygen evolving catalyst was supported onto the Ketjen black as the carbon material.

Next, the Ketjen black bearing the oxygen evolving catalyst and a PTFE binder (manufactured by DAIKIN INDUSTRIES, LTD.) were kneaded together in a weight ratio of 90:10 in an ethanol solvent to give a mixture. The mixture was rolled with a roll press into an electrode sheet. The electrode sheet thus obtained was cut to give a positive electrode (a positive electrode layer).

Lithium bis(trifluoromethanesulfonyl)amide (LiTFSA, manufactured by Kishida Chemical Co., Ltd.) was mixed with and dissolved into tetraethyleneglycol dimethyl ether (TEGDME, manufactured by Kishida Chemical Co., Ltd.) with a concentration of 1 mol/L. The mixture solution was stirred in a dry air atmosphere at a dew point of not more than −50° C. for 24 hours. A nonaqueous electrolytic solution was thus obtained.

A glass fiber separator was provided for use as a separator. A SUS304 mesh (manufactured by The Nilaco Corporation) as a current collector was attached to a lithium metal foil (manufactured by THE HONJO CHEMICAL CORPORATION) to form a negative electrode. The positive electrode, the separator, the nonaqueous electrolytic solution and the negative electrode were assembled into a lithium air battery having a structure illustrated in FIG. 1.

Comparative Example 1

A lithium air battery of COMPARATIVE EXAMPLE 1 was fabricated in the same manner as in EXAMPLE 1, except that the oxygen evolving catalyst of the formula (3) was not used.

(Charge Discharge Test)

The lithium air batteries of EXAMPLE 1 and COMPARATIVE EXAMPLE 1 were held in an oxygen atmosphere for at least 20 minutes and were thereafter subjected to a charge discharge test. The current density during discharging was 0.4 mA/cm$^2$, and the cutoff voltage was 2.0 V. The current density during charging was 0.1 mA/cm$^2$, and the cutoff voltage was 4.5 V. The batteries were first discharged and then charged. The results are shown in FIG. 2.

Figure 2:
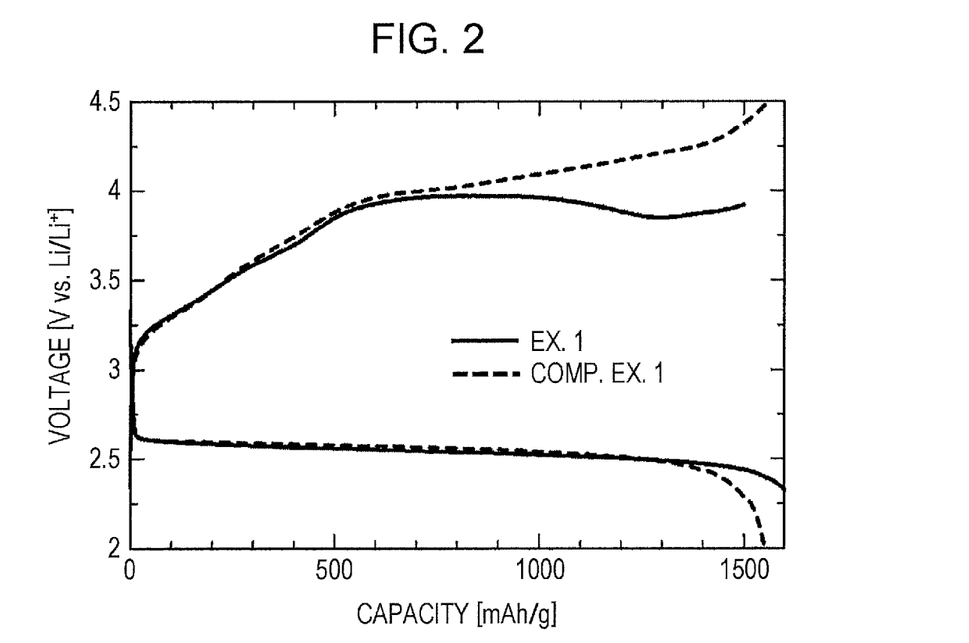
FIG. 2 is a graph illustrating charge discharge curves of lithium air batteries of EXAMPLE 1 and COMPARATIVE EXAMPLE 1.

As illustrated in FIG. 2, the charging potential of the lithium air battery of COMPARATIVE EXAMPLE 1 increased as the charging progressed. The lithium air battery of EXAMPLE 1 showed a smaller increase in charging potential than COMPARATIVE EXAMPLE 1. The low charging potential in EXAMPLE 1 is probably on account of the decomposition of lithium peroxide being promoted by the oxygen evolving catalyst.

In EXAMPLE 1, the trimethoxysilyl groups (—Si(OCH$_3$)$_3$) which were the silane coupling groups of the oxygen evolving catalyst readily reacted with the hydroxyl groups or carboxyl groups on the surface of the carbon material to form bonds. In the step of fixing the oxygen evolving catalyst to the surface of the carbon material, the amount in which the oxygen evolving catalyst is bonded to the carbon material can be controlled easily by controlling the concentration of the oxygen evolving catalyst in the solution. The amount of the oxygen evolving catalyst bonded can be determined by differential thermogravimetric analysis or by back titration of the surface functional groups.

Differential thermogravimetric analysis and cyclic voltammetry showed that in EXAMPLE 1, 1.2×10$^{-4}$ mol oxygen evolving catalyst had been supported per 1 g of the carbon material. In cyclic voltammetry of an electrode, the molar amount of an oxygen evolving catalyst exhibiting redox properties on the electrode can be calculated by integrating the current which has flown with respect to time. Further, the electrolytic solution after the charging and discharging was visually inspected and found to be free from coloration by the oxygen evolving catalyst, which showed that there had been no leaching of the oxygen evolving catalyst into the electrolyte during the charging and discharging process.

Comparative Example 2

A lithium air battery of COMPARATIVE EXAMPLE 2 was fabricated in the same manner as in EXAMPLE 1, except that the oxygen evolving catalyst of the formula (3) was not supported on the carbon material but was dissolved into the nonaqueous electrolytic solution. In COMPARATIVE EXAMPLE 2, 100 μmol oxygen evolving catalyst was dissolved into 5 mL nonaqueous electrolytic solution. That is, the concentration of the oxygen evolving catalyst in the nonaqueous electrolytic solution was 20 mmol/L.

(Charge Discharge Cycle Test)

Figure 3:
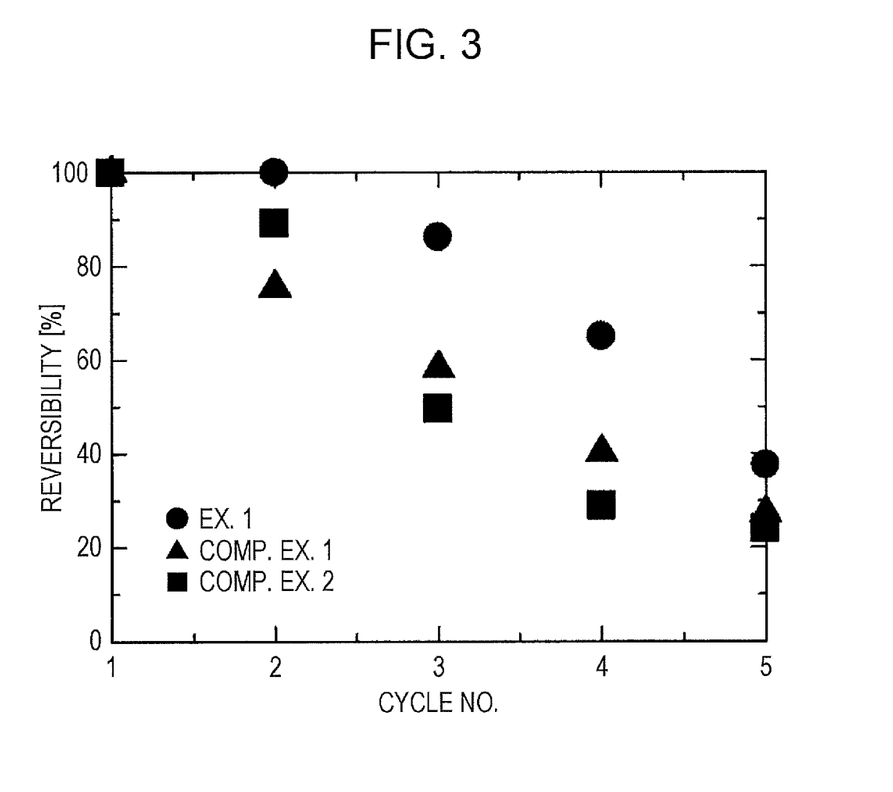
FIG. 3 is a graph illustrating cycle characteristics of lithium air batteries of EXAMPLE 1 and COMPARATIVE EXAMPLES 1 and 2.

The lithium air batteries of EXAMPLE 1, COMPARATIVE EXAMPLE 1 and COMPARATIVE EXAMPLE 2 were subjected to a charge discharge cycle test under the same conditions as in the charge discharge test described earlier. Specifically, the batteries were discharged and charged five times. The results are illustrated in FIG. 3. In FIG. 3, the abscissa indicates the number of charging and discharging cycles, and the ordinate the ratio of the discharge capacity in each cycle relative to the discharge capacity in the first cycle.

As illustrated in FIG. 3, the lithium air battery of EXAMPLE 1 had a small decrease in capacity as compared to the lithium air batteries of COMPARATIVE EXAMPLE 1 and COMPARATIVE EXAMPLE 2. This enhancement in cycle characteristics probably stems from the fact that in the lithium air battery of EXAMPLE 1, the oxygen evolving catalyst promoted the decomposition of lithium peroxide and was kept away from the contact with lithium metal and was thus prevented from being deactivated.

In COMPARATIVE EXAMPLE 2, the oxygen evolving catalyst was dissolved in the nonaqueous electrolytic solution. In this case, the effect of the oxygen evolving catalyst is limited by the rate of the diffusion of the oxygen evolving catalyst from the nonaqueous electrolytic solution to the surface of the positive electrode. In contrast, the oxygen evolving catalyst of EXAMPLE 1 was chemically bonded to the functional groups on the surface of the carbon material so as to form a thin layer on the order of nanometers in thickness on the surface of the carbon material constituting the positive electrode. By virtue of this layer, the charging reaction in EXAMPLE 1 was probably allowed to take place efficiently, and consequently the cycle characteristics were enhanced.

In Comparative Example 2, 100 μmol oxygen evolving catalyst was dissolved into 5 mL nonaqueous electrolytic solution. In EXAMPLE 1, the density of the oxygen evolving catalyst was $1.2 \times 10^{-4}$ mol per 1 g of the carbon material. The molar amount of the oxygen evolving catalyst in EXAMPLE 1 was calculated as 1.2 μmol from the weight of the positive electrode layer (10 mg). That is, the amount of the oxygen evolving catalyst used in the lithium air battery of EXAMPLE 1 was far smaller than the amount of the oxygen evolving catalyst used in the lithium air battery of COMPARATIVE EXAMPLE 2. In EXAMPLE 1, the oxygen evolving catalyst exhibited a high catalytic effect at a small dose.

According to the present disclosure, an oxygen evolving catalyst can be easily bonded to the surface of a carbon material through a Si—O bond, and consequently a large amount of the oxygen evolving catalyst can be supported on the surface of the carbon material with better efficiency.

What is claimed is:

1. An air battery comprising:
a negative electrode allowing a metal ion to be occluded in the negative electrode and released from the negative electrode;
a positive electrode configured to use oxygen in air as a positive electrode active material;
a nonaqueous metal ion conductor disposed between the negative electrode and the positive electrode; and
an oxygen evolving catalyst, wherein
the positive electrode includes a carbon material,
the oxygen evolving catalyst is a compound having a structure represented by the following formula:

wherein $R_1$ to $R_4$ are each independently a functional group including one selected from the group consisting of a linear aliphatic group, a cyclic aliphatic group, a hydrogen atom, a hydroxyl group, a cyano group, an amino group, a nitro group, a nitroso group, a vinyl group, an epoxy group, a methacryloyl group, an acryloyl group, an ureido group, a mercapto group and an isocyanate group,
at least one selected from $R_1$ to $R_4$ includes Si, and
the at least one selected from $R_1$ to $R_4$ is bonded to a surface of the carbon material through a Si—O bond.

2. The air battery according to claim 1, wherein the linear aliphatic group includes one selected from the group consisting of an oxygen atom, a nitrogen atom, a sulfur atom, a silicon atom, a phosphorus atom, a boron atom and a halogen atom.

3. The air battery according to claim 1, wherein the cyclic aliphatic group includes one selected from the group consisting of an oxygen atom, a nitrogen atom, a sulfur atom, a silicon atom, a phosphorus atom, a boron atom and a halogen atom.

4. The air battery according to claim 1, wherein each of the oxygen evolving catalysts is a compound having a structure represented by the following formula:

wherein $R_1$ to $R_4$ are each independently a functional group including one selected from the group consisting of a linear aliphatic group, a cyclic aliphatic group, a hydrogen atom, a hydroxyl group, a cyano group, an amino group, a nitro group, a nitroso group, a vinyl group, an epoxy group, a methacryloyl group, an acryloyl group, an ureido group, a mercapto group and an isocyanate group, $R_5$ is a saturated hydrocarbon group with 1 to 6 carbon atoms or an unsaturated hydrocarbon group with 1 to 6 carbon atoms, and $R_6$ to $R_8$ are each independently a functional group including at least one selected from the group consisting of a methoxy group, an ethoxy group, a 2-methoxyethoxy group and an acetoxy group.

5. The air battery according to claim 4, wherein the linear aliphatic group includes one selected from the group consisting of an oxygen atom, a nitrogen atom, a sulfur atom, a silicon atom, a phosphorus atom, a boron atom and a halogen atom.

6. The air battery according to claim 4, wherein the cyclic aliphatic group includes one selected from the group consisting of an oxygen atom, a nitrogen atom, a sulfur atom, a silicon atom, a phosphorus atom, a boron atom and a halogen atom.

7. The air battery according to claim 4, wherein the saturated hydrocarbon group with 1 to 6 carbon atoms has a substituent.

8. The air battery according to claim 4, wherein the unsaturated hydrocarbon group with 1 to 6 carbon atoms has a substituent.

\* \* \* \* \*